March 18, 1958 R. J. MASSONGILL 2,827,084
BAND SAW TABLE ATTACHMENT FOR FORMING CONTAINERS
Filed April 25, 1955 5 Sheets-Sheet 1

Robert J. Massongill
INVENTOR.

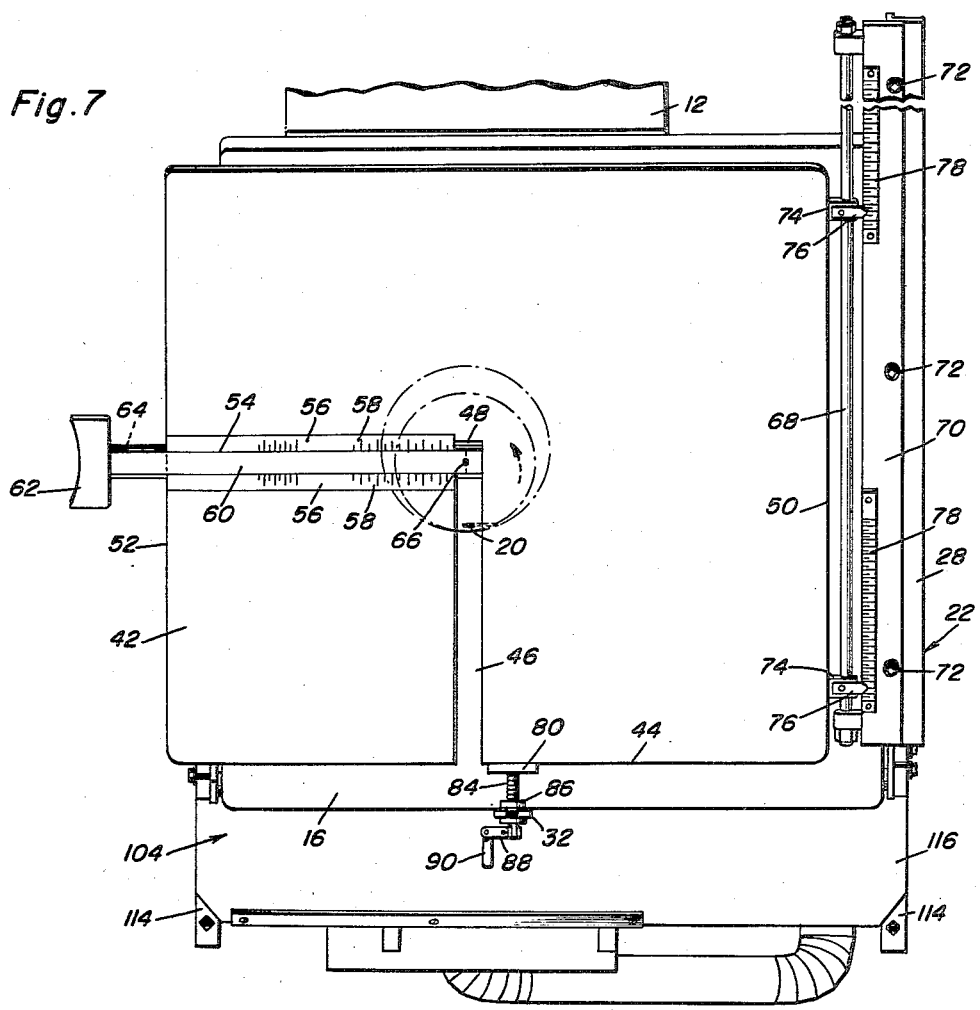

March 18, 1958 R. J. MASSONGILL 2,827,084
BAND SAW TABLE ATTACHMENT FOR FORMING CONTAINERS
Filed April 25, 1955 5 Sheets-Sheet 3
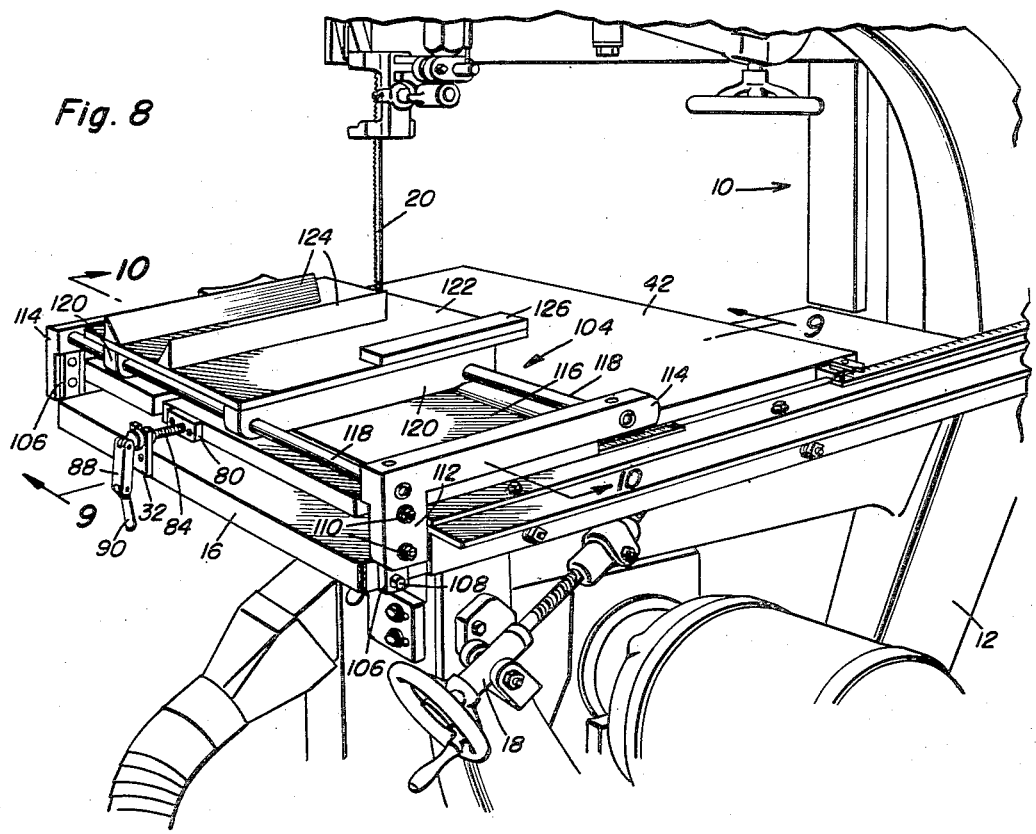
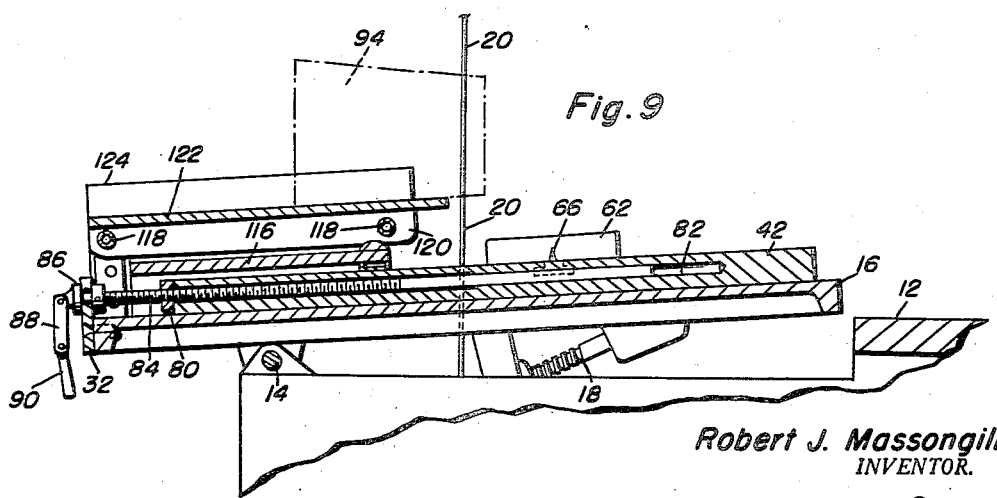
Robert J. Massongill
INVENTOR.

March 18, 1958   R. J. MASSONGILL   2,827,084
BAND SAW TABLE ATTACHMENT FOR FORMING CONTAINERS
Filed April 25, 1955   5 Sheets-Sheet 4
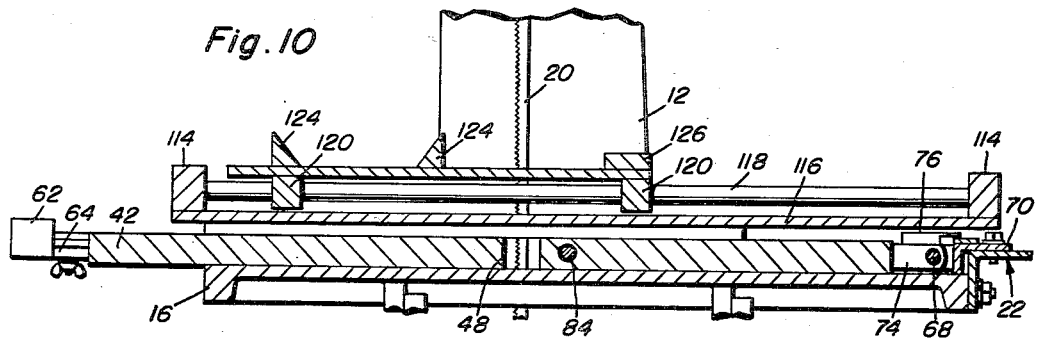
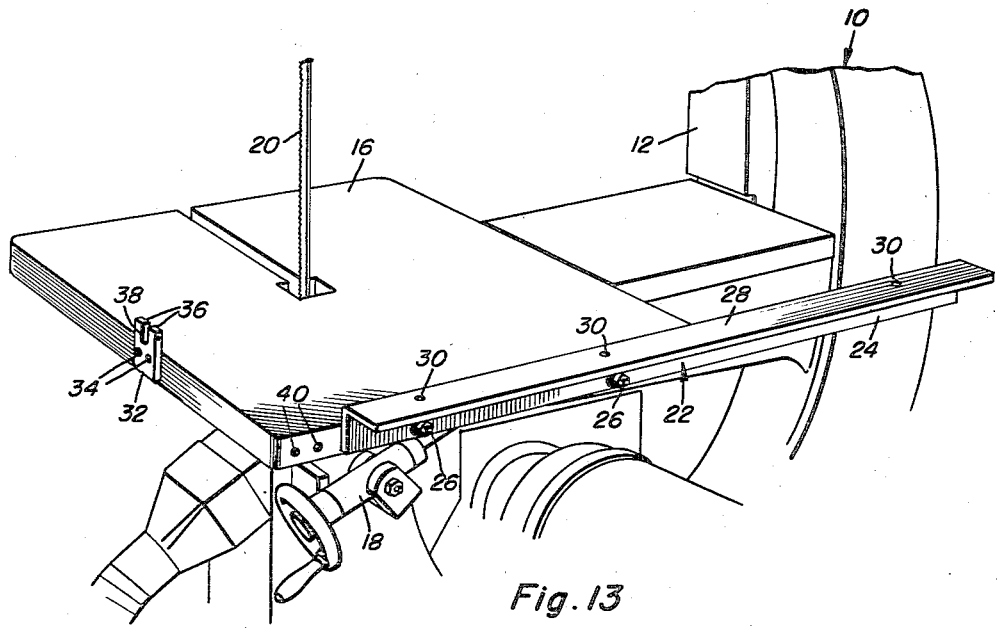
Robert J. Massongill
INVENTOR.

March 18, 1958 R. J. MASSONGILL 2,827,084
BAND SAW TABLE ATTACHMENT FOR FORMING CONTAINERS
Filed April 25, 1955 5 Sheets-Sheet 5

Robert J. Massongill
INVENTOR.

BY *Clarence A. O'Brien*
and *Harvey B. Jacobson*
Attorneys

United States Patent Office 2,827,084
Patented Mar. 18, 1958

2,827,084

BAND SAW TABLE ATTACHMENT FOR FORMING CONTAINERS

Robert J. Massongill, Pomona, Calif., assignor to Ernest R. Gieser, Upland, Calif.

Application April 25, 1955, Srial No. 503,397

8 Claims. (Cl. 143—26)

This invention relates in general to new and useful improvements in container construction, and more specifically to both an improved apparatus for forming containers from single blocks of wood, and an improved form of body construction for containers.

The primary object of this invention is to provide an improved container which includes a body portion formed of a single block of wood with the fibers of the body portion remaining in their natural state.

Still another object of this invention is to provide an improved apparatus for forming from a block of wood utilizing a band saw a body portion of a container, the body portion being in the form of a single unit of annular cross-section cut from a block.

Still another object of this invention is to provide an improved attachment for band saws, the attachment being of such a nature whereby a frusto-conical body portion of a container may be conveniently sawed from a block utilizing a conventional band saw, the body portion being formed of one piece.

Still another object of this invention is to provide an improved attachment for band saws, the attachment being in the form of an auxiliary table having means for mounting and feeding the same with respect to a band saw table and its associated blade, the table having a first slot for permitting movement of the table with respect to the band saw, and a second slot or guide receiving a slide member having a pivot thereon for mounting a block to be cut.

A further object of this invention is to provide an improved method of forming body portions and bottoms of containers from a single block of wood utilizing a conventional type of band saw.

A still further object of this invention is to provide an improved cut-off attachment for band saws, the cut-off attachment including a table slidable transversely of a band saw blade and having mounting means thereon for supporting a circular cross-sectional member to be sawed off.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7 is an enlarged fragmentary plan view of the table portion of the band saw of Figure 1 and shows mounted thereon the auxiliary table attachment, which is the subject of this invention, and shows the general details thereof, there being shown by broken lines the manner in which body members and plugs of different diameters may be cut with the use of the auxiliary table attachment.

Figure 8 is a fragmentary perspective view of the band saw of Figure 6 and shows a cut-off attachment thereof pivoted into an operative position resting upon the auxiliary table;

Figure 9 is an enlarged fragmentary vertical sectional view taken substantially upon the plane indicated by the section line 9—9 of Figure 8 and shows the specific details of both the feed arrangement for the auxiliary table and the mounting of the cut-off table;

Figure 10 is a fragmentary vertical sectional view taken substantially on the plane indicated by the section line 10—10 of Figure 8 and further shows the details of the auxiliary table and the cut-off table;

Figure 6:
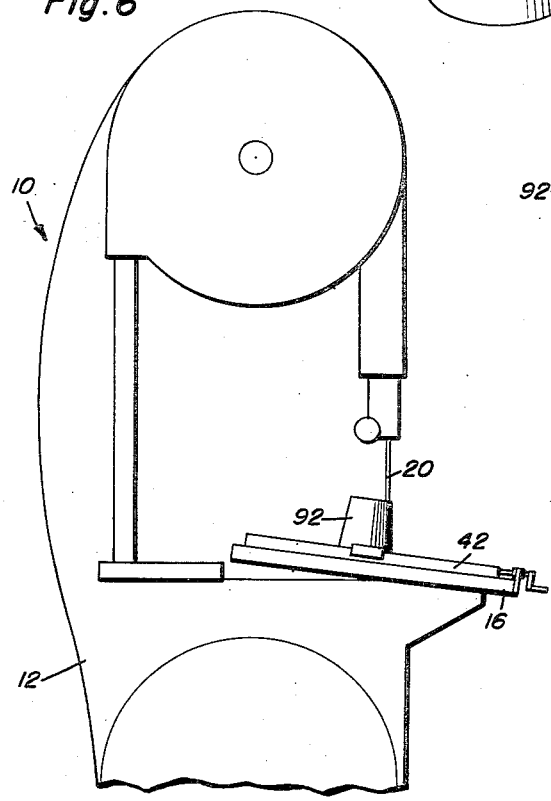
Figure 6 is a fragmentary side elevational view of a conventional type of band saw and shows the table thereof tilted and having mounted thereon an attachment, which is the subject of this invention, the attachment carrying a block which is being cut by the blade of the band saw to form either the body portion of Figure 1 or the tapered plug of Figure 4, the view being on a reduced scale.
Figure 14:
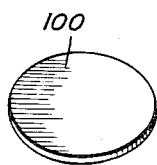

Figure 13 (Sheet 4) is an enlarged fragmentary perspective view of the table portion of the band saw of Figure 6 and shows the same with the attachments, which are the subject of this invention, omitted, and there being connected to the band saw table only those mounting brackets necessary for attaching the attachments; and Figure 14 is a perspective view of a container bottom formed with the band saw attachment.

Referring now to the drawings in detail, it will be seen that there is illustrated a conventional type of band saw which is referred to in general by the reference numeral 10. Among other details, the band saw 10 includes a frame 12 which has mounted thereon for pivotal movement by means of a transverse shaft 14 a band saw table 16. The table 16 is selectively tilted by a tilting mechanism 18 carried by the frame 12. The band saw 10 also includes a band saw blade 20 which is disposed transversely of the table 16. Inasmuch as the other portions of the band saw 10 play no part in the present invention other than that of their normal functions, they will not be described in more detail hereinafter.

Referring now to Figure 13 in particular, it will be seen that there is secured to the table 16 along one side edge thereof an angle member 22. The angle member 22 includes a vertical flange 24 which is secured to the side edge of the table 16 in face-to-face relation by suitable fasteners 26. The angle member 24 also includes an upper horizontal flange 28 which is disposed above the plane of the table 16 and which is provided with a plurality of longitudinally spaced fastener receiving openings 30.

Also carried by the band saw table 16, but along the front edge thereof, is an upstanding mounting bracket 32. The mounting bracket 32 is secured to the front edge of the band saw table 16 by suitable fasteners 34 and has the upper part thereof bifurcated to form upstanding legs 36 and a central seat 38.

The band saw table 16 is further modified for the purpose of the present invention by forming in the side edges thereof adjacent the front edge spaced pairs of threaded bores 40. The purpose of the bores 40 will be set forth in more detail hereinafter.

The present invention includes an auxiliary table 42 which is slightly smaller than the band saw table 16. The table 42 includes a front edge 44 which has opening therethrough an elongated longitudinal slot 46. The slot 46 terminates in a central band saw blade receiving opening 48.

The auxiliary table 42 also includes side edges 50 and 52. Extending normal to the side edge 52 and extending between the side edge 52 and the opening 48 is a guideway 54. The guideway 54 is formed in the upper part of the auxiliary table 42 and is of an inverted T-shaped cross-section. Overlying the guideway 54 is a pair of strips 56. The strips 56 are provided with a suitable scale or gauge 58 whose purpose will be set forth in more detail hereinafter.

Figure 12:
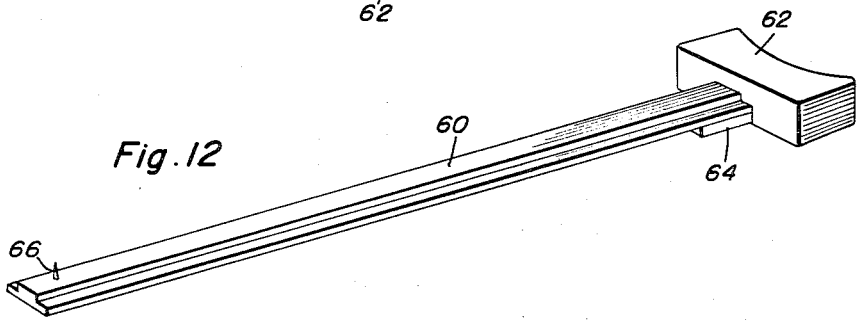
Figure 12 is an enlarged perspective view of a slide member having a table on which a block to be sawed is mounted.

Referring now to Figure 12 in particular, it will be seen that there is illustrated a slide member which is referred to in general by the reference numeral 60. The slide member 60 is of inverted T-shaped cross-section which conforms to the cross-section of the guideway 54. Formed on one end of the slide member 60 is a handle member 62 to facilitate the positioning of the slide member 60 with respect to the auxiliary table 42. Secured to the underside of the slide member 60 immediately adjacent the handle member 62 is a stop block 64. The opposite end of the slide member 60 is provided with an upstanding pointed pivot 66 whose purpose will be set forth in more detail hereinafter.

In order that the auxiliary table 42 may be mounted on the band saw table 16, there is provided a longitudinally extending track 68 (Figs. 7 and 10) which is disposed closely adjacent the side edge 50 and which overlies the band saw table 16. The track 68 is carried by an elongated mounting bar 70 which overlies the flange 28 of the angle member 22 and is secured thereto by suitable fasteners 72. Secured to the side edge 50 and extending outwardly therefrom is a pair of longitudinally spaced guide members 74. The guide members 74 are slidably supported on the track 68 to limit movement of the auxiliary table 42 longitudinally of the band saw table 16.

In order to determine the position of the auxiliary table 42 with respect to the band saw blade 20, there is carried by the guide members 74 suitable pointers 76. The pointers 76 cooperate with gauges or scales 78 which are carried by the attaching bar 70.

In order to facilitate shifting and positioning of the auxiliary table 42 with respect to the band saw table 16, there is carried by the forward edge 44 of the auxiliary table 42 a nut member 80. The nut member 80 is aligned with a longitudinal bore 82 formed in the auxiliary table 42, as is best illustrated in Figure 9. Threadedly engaged in the nut 80 and passing into the bore 82 is an elongated feed screw 84. The feed screw 84 is provided at its forward end with a grooved collar 86 which is selectively received in the seat 38 (Fig. 13) of the mounting bracket 32. Pivotally connected to the forward end of the feed screw 84 is a crank arm 88 which has pivotally connected thereto a handle 90.

When it is desired to utilize the auxiliary table 42, it is merely necessary to seat the auxiliary table 42 on the band saw table 16 with the grooved collar 86 being received in the mounting bracket 82 and the attaching bar 70 overlying the angle member 22. The attaching bar 70 may then be secured to the angle member 22 by means of the fastener 72, after which the auxiliary table 42 is ready for use.

Figure 1:
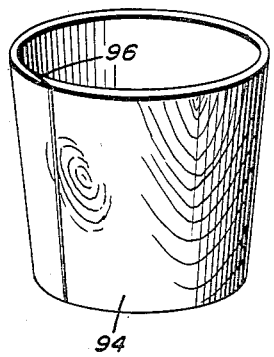
Figure 1 is a perspective view of a body portion of a container which has been cut from a single block of wood, the body portion being of a frusto-conical shape.
Figure 2:
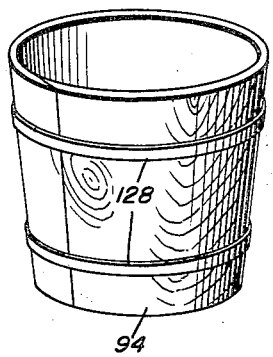
Figure 2 is a perspective view of the body portion of Figure 1 after it has been formed into a container, the body portion being reinforced by exterior straps.
Figure 5:
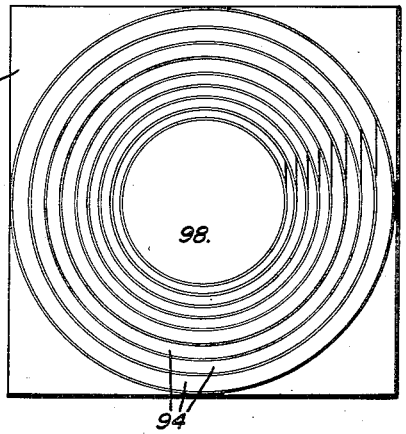
Figure 5 is a plan view of a block showing the position of saw lines thereon for the purpose of forming a plurality of internested body portions in a central tapered plug.

In the use of the auxiliary table 42 and the components carried thereby, a square block, such as the block 92 illustrated in Figure 5, is centrally mounted on the pivot pin 66. After the band saw table 16 has been tilted to the desired angle, as is best illustrated in Figure 6, the auxiliary table 42 is adjusted with respect to the band saw blade 20 for cutting the desired diameter circle. Then, the slide member 60 is slid into the auxiliary table 42 to start the cut with the band saw blade 20. The inward movement of the block 92 is limited by engagement of the stop member 64 with the side edge 52 of the auxiliary table 42. After the block 92 has been advanced to this position, it is then manually rotated about the pivot pin 66 to cut an external frusto-conical surface of the desired diameter. The outer shavings removed from the block 92 are then moved off the auxiliary table 42, and the block 92 is withdrawn. Next, through the use of the feed screw 84, the table 42 is moved inwardly to form the next desired cut. After this has been accomplished, the slide member 60 is again moved toward the band saw blade 20 to start the band saw blade in the block 92. After the slide member 60 has been pushed all the way in, the block 92 is again rotated so as to cut therefrom a frusto-conical member 94 which is best illustrated in Figure 1. The frusto-conical member 94 forms the body portion of a container to be described in more detail hereinafter and is formed of a single piece of wood with the fibers thereof in their natural state. The frusto-conical member 94 includes opposed end portions 96 which are formed as a result of the initial cut by the band saw blade 20. These opposed end portions 96 may be secured together by glue or other desirable securing means.

Figure 4:
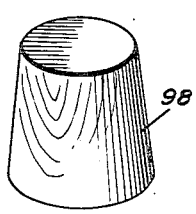
Figure 4 is a perspective view of a tapered plug formed from a center of a block utilized in forming the body portion of Figure 1.

After a first frusto-conical member 94 has been cut from the block 92, the process is repeated until a plurality of such frusto-conical members 94 have been formed. The additional frusto-conical members 94 will be of a smaller diameter than the original ones, and they will be of such a nature whereby they may be conveniently nested for storage purposes. After the size of the block 92 has been greatly reduced, the end result will be a tapered plug, such as the plug 98 of Figure 4. The plug 98 can be utilized in ship repair work and other typical uses.

In order to form a container from the frusto-conical member 94, it is necessary that there be provided a bottom. Such a bottom is best illustrated in Figure 14 and is referred to by the reference numeral 100. It is to be understood that the bottoms 100 will vary in size depending upon the frusto-conical member 94 with which it is to be utilized.

Figure 11:
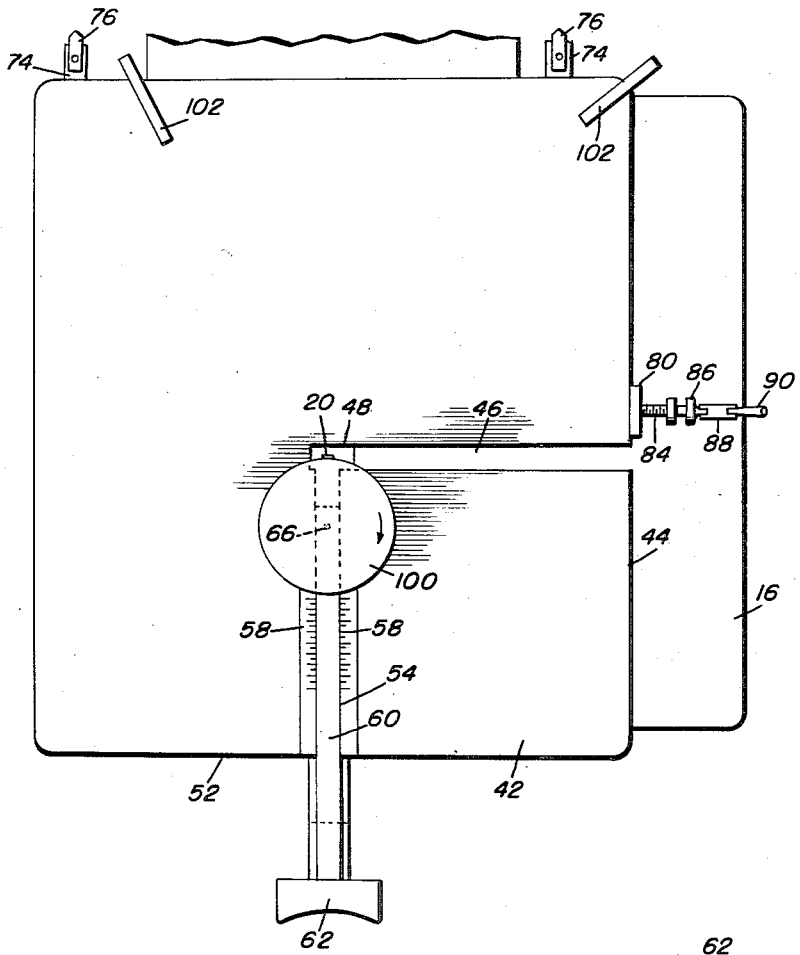
Figure 11 is a top plan view on a large scale of the table portion of the band saw of Figure 6 and shows mounted thereon the auxiliary table of Figure 7, there being utilized clamp means for securing the auxiliary table on the band saw table and the auxiliary table being utilized for the purpose of cutting circular tops and bottoms for a container.

In order to form the bottom 100, it is necessary that the auxiliary table 42 be shifted with respect to the band saw table 16 in the manner best illustrated in Figure 11. At this time, the front edge 44 becomes a side edge, and the side edge 52 becomes the front edge, the auxiliary table 42 being rotated 90° from its position of Figure 7. The auxiliary table 42 is centered with respect to the band saw blade 20, and the band saw table 16 and is secured in that position by suitable clamps 102 which extend over the rear portion of the band saw table 16 and that portion of the auxiliary table 42 which is now disposed at the rear of the band saw table 16.

When the auxiliary table 42 is in the position of Figure 11, the band saw table 16 is in its horizontal position. Then, a board from which the bottom 100 is to be formed is placed on the pivot pin 66. The slide member 60 is then moved into the guideway 54 until an edge of the board (not shown) abuts the band saw blade 20. The board should be positioned on the pin 66 so that the distance from the edge abutting the band saw 20 to the pin 66 is the radius of the bottom 100 to be cut. The board is then rotated about the pivot pin 66 to cut the bottom 100. If desired, the scale 58 may be utilized in positioning a board of an odd size or dimension.

In order that a frusto-conical member, such as the member 94, may have the ends thereof cut off square, there is provided a cut-off assembly which is referred to in general by the reference numeral 104 (Figs. 7, 8 and 9). The cut-off assembly 104 includes a pair of brackets 106 secured to opposite sides of the band saw table 16 by means of fasteners 108 passing into the threaded bores 40. The fasteners 108 are so positioned whereby the brackets 106 are mounted for pivotal movement. Secured to the upper portions of the brackets 106 by suitable fasteners 110 are depending legs 112 of support arms 114 which are disposed at opposite sides of the band saw table 16. The support arms 114 have secured to the underside thereof a base 116. The base 116 normally rests upon the auxiliary table 42 when the cut-off assembly 104 is in an operating position.

Extending between the support arms 114 is a pair of longitudinally spaced rails 118. Mounted on the rails 118 is a pair of transversely spaced support bars 120. The support bars 120 are connected together by a cut-off table 122. The relationship between the support bars 120 and the rails 118 is such that the cut-off table 122 may be reciprocated transversely of the saw blade 20 and the band saw table 16.

In order that a cylindrical or frusto-conical member may be mounted on the cut-off table 112, there is provided a cradle formed by a pair of transversely spaced, longitudinally extending members 124. In order to facilitate reciprocation of the cut-off table 122, there is provided a suitable handle 126. As is best illustrated in Figure 9, the frusto-conical member 94 to be cut off to the desired length and have the ends thereof squared is placed on the cut-off table 122 between the members 124. At this time, the frusto-conical member 94 is disposed at one side of the saw blade 20. The cut-off table 122 is then moved transversely of the band saw table 16 to permit the band saw blade 20 to cut off the end portion of the frusto-conical member 94.

As is best illustrated in Figure 7, the cut-off assembly 104 may be pivoted to an out-of-the-way position with respect to the auxiliary table 42. Thus, the frusto-conical members 94 may be first formed and then cut off to the desired length and squareness by merely flipping the cut-off assembly 104 into the position illustrated in Figure 8.

After the frusto-conical members 94 have been cut off to the desired height, they are provided with one of the bottoms 100. At this time, the opposed ends 96 are suitably glued together. The completed container may be retained in this form, in which case, it will have the same appearance as that of the frusto-conical member 94 in Figure 1. On the other hand, if desired, the frusto-conical member 94, which forms the body portion of the container, may be reinforced by suitable straps 128. The straps 128 may be of the type utilized in strapping boxes and packages.

Figure 3:
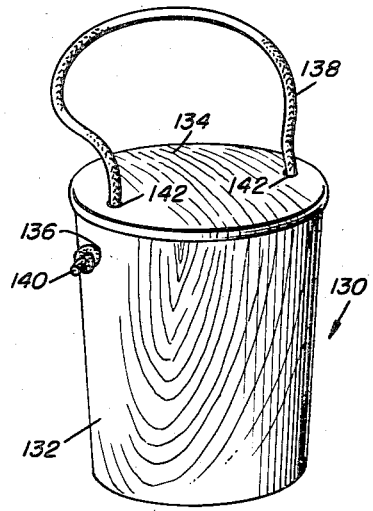
Figure 3 is a perspective view of a slightly modified form of container utilizing a body portion similar to the body portion of Figure 1.

Referring now to Figure 3 in particular, it will be seen that there is illustrated a modified form of container which is referred to in general by the reference numeral 130. The container 130 includes a body portion 132 formed of one of the frusto-conical members 94. While it has not been so illustrated, the container 130 also includes a bottom member 100. Further, the container 130 includes a top 134 which will be formed in the same manner described above with respect to the bottoms 100.

In order that the container 130 may be conveniently carried, there is passed through diametrically opposite openings 136 formed in the upper part of the body portion 132 a flexible bail 138. The ends of the bail 138 are in the form of knots 140. The top 134 is also provided with suitable openings 142 through which intermediate portions of the bail 138 pass. It will be readily apparent that when the bail 138 is grasped to carry the container 130, the bail 138 will retain the top 134 in position. Also, when the bail 130 is not in use and it is desired to open the container 130, the bail 138 will prevent accidental loss or separation of the top 134 from the remainder of the container 130.

While the present invention has been described and illustrated as being directed to means for making frusto-conical members for use as containers or the like, it is to be understood that the invention is not so limited. By failing to tilt the band saw table 16, cylindrical body members for containers and the like may be formed in a similar manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for band saw tables comprising an auxiliary table, table securing means for securing said auxiliary table to a band saw table, an elongated band saw blade slot opening through an edge of said auxiliary table, a guideway in said auxiliary table, said guideway being disposed normal to and intersecting said slot at an inner end thereof, a slide member slidingly retained in said guideway, an upstanding pivot on said slide member for mounting a block to be cut by the band saw, stop means engaging said slide member to align said pivot with said slot, said table securing means including a track, a mounting bracket supporting said track, means for securing said bracket to the band saw table, guide members secured to said auxiliary table, said guide members being slidably positioned on said track, said track being disposed parallel to said slot, adjustable means connected to said auxiliary table to adjust the position of said pivot relative to a band saw blade.

2. An attachment for band saw tables comprising an auxiliary table, table securing means for securing said auxiliary table to a band saw table, an elongated band saw blade slot opening through an edge of said auxiliary table, a guideway in said auxiliary table, said guideway being disposed normal to and intersecting said slot at an inner end thereof, a slide member slidingly retained in said guideway, an upstanding pivot on said slide member for mounting a block to be cut by the band saw, stop means engaging said slide member to align said pivot with said slot, said table securing means including a track, a mounting bracket supporting said track, means for securing said bracket to the band saw table, guide members secured to said auxiliary table, said guide members being slidably positioned on said track, said track being disposed parallel to said slot, adjustable means connected to said auxiliary table to adjust the position of said pivot relative to a band saw blade, means for mounting said adjustable means on the band saw table, said adjustable means including an adjusting screw disposed parallel to said track.

3. An atachment for band saw tables comprising an auxiliary table, means for securing said auxiliary table to a band saw table, an elongated band saw blade slot opening through an edge of said auxiliary table, a guideway in said auxiliary table, said guideway being disposed normal to and intersecting said slot at an inner end thereof, a slide member slidingly retained in said guideway, an upstanding pivot on said slide member for mounting a block to be cut by the band saw, stop means engaging said slide member to align said pivot with said slot, adjustable means connected to said auxiliary table to adjust the position of said pivot relative to a band saw blade, means for mounting said adjustable means on the band saw table.

4. An attachment for band saw tables comprising an auxiliary table, table securing means for securing said auxiliary table to a band saw table, an elongated band saw blade slot opening through an edge of said auixiliary table, a guideway in said auxiliary table, said guideway being disposed normal to and intersecting said slot at an inner end thereof, a slide member slidingly retained in said guideway, an upstanding pivot on said slide member for mounting a block to be cut by the band saw, stop means engaging said slide member to align said pivot with said slot, said table securing means including a track, a mounting bracket supporting said track, means for securing said bracket to the band saw table, guide members secured to said auxiliary table, said guide members being slidably positioned on said track, said track being disposed parallel to said slot, said mounting bracket including a gauge, a pointer carried by one of said guide members cooperating with said gauge for facilitating positioning of said auxiliary table and said pivot relative to the band saw blade.

5. An attachment for band saw tables comprising an auxiliary table, means for securing said auxiliary table to a band saw table, said auxiliary table including a central band saw blade opening, an elongated band saw blade slot opening through an edge of said auxiliary table and communicated with said central opening, a guideway in said auxiliary table, said guideway being disposed normal to said slot, a slide member slidingly retained in said guideway, an upstanding pivot on said slide member for mounting a block to be cut by the band saw, said means including a track, a mounting bracket supporting said track, means for securing said bracket to the band saw table, guide members secured to said auxiliary table, said guide members being slidably positioned on said track, said track being disposed parallel to said slot, adjustable feed means connected to said auxiliary table, means for mounting said feed means on the band saw table, said feed means including a feed screw, a nut member carried by said auxiliary table, said feed screw being threadedly engaged in said nut, a grooved collar secured to said feed screw, said mounting means for said feed means including a bifurcated bracket adapted to be secured to the band saw table, said bifurcated bracket releasably receiving said grooved collar.

6. An attachment for band saw tables comprising an auxiliary table, means for securing said auxiliary table to a band saw table, said auxiliary table including a central band saw blade opening, an elongated band saw blade slot opening through an edge of said auxiliary table and communicated with said central opening, and a cut-off assembly, said cutoff assembly including a base adapted to rest on said auxiliary table, spaced parallel support arms secured to said base, means for pivotally connecting said support arms to a side of the band saw table to permit movement of said cut-off assembly to an out-of-the-way position, a cut-off table, means for mounting said cut-off table for sliding movement between said support arms past the band saw blade when the base rests on the auxiliary table.

7. An attachment for band saw tables comprising an auxiliary table, means for securing said auxiliary table to a band saw table, said auxiliary table including a central band saw blade opening, an elongated band saw blade slot opening through an edge of said auxiliary table and communicated with said central opening, and a cut-off assembly, said cut-off assembly including a base adapted to rest on said auxiliary table, spaced parallel support arms secured to said base, means for pivotally connecting said support arms to a side of the band saw table to permit movement of said cut-off assembly to an out-of-the-way position, a cut-off table, means for mounting said cut-off table for sliding movement between said support arms past the band saw blade when the base rests on the auxiliary table, said last mentioned means including spaced parallel rails extending between said support arms, spaced work support bars secured to said cut-off table and guidingly mounted on said rails.

8. An attachment for band saw tables comprising an auxiliary table, means for securing said auxiliary table to a band saw table, said auxiliary table including a central band saw blade opening, an elongated band saw blade slot opening through an edge of said auxiliary table and communicated with said central opening, and a cut-off assembly, said cut-off assembly including a base adapted to rest on said auxiliary table, spaced parallel support arms secured to said base, means for pivotally connecting said support arms to a side of the band saw table to permit movement of said cut-off assembly to an out-of-the-way position, a cut-off table, means for mounting said cut-off table for sliding movement between said support arms past the band saw blade when the base rests on the auxiliary table, a cradle for circular cross-sectional workpieces, said cradle being mounted on said cut-off table.

References Cited in the file of this patent

UNITED STATES PATENTS

| | | |
|---|---|---|
| 380,742 | Berkey | Apr. 10, 1888 |
| 412,160 | Bond | Oct. 1, 1889 |
| 722,999 | Manuel | Mar. 17, 1903 |
| 799,483 | Metcalfe | Sept. 12, 1905 |
| 2,157,310 | Ward | May 9, 1939 |
| 2,506,959 | Helbig | May 9, 1950 |
| 2,535,673 | Forbes | Dec. 26, 1950 |
| 2,548,698 | Benge | Apr. 10, 1951 |
| 2,653,633 | Anderson | Sept. 29, 1953 |
| 2,678,070 | Davis, Sr. | May 11, 1954 |

FOREIGN PATENTS

| | | |
|---|---|---|
| 342,792 | Great Britain | Feb. 12, 1931 |
| 24,501 | Netherlands | July 15, 1931 |